United States Patent
Fang et al.

(10) Patent No.: US 12,463,274 B2
(45) Date of Patent: Nov. 4, 2025

(54) BATTERY CELL, METHOD AND SYSTEM FOR MANUFACTURING SAME, BATTERY, AND ELECTRICAL DEVICE

(71) Applicant: CONTEMPORARY AMPEREX TECHNOLOGY (HONG KONG) LIMITED, Hong Kong (CN)

(72) Inventors: Kun Fang, Fujian (CN); Zhijun Guo, Fujian (CN); Haizu Jin, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 66 days.

(21) Appl. No.: 18/242,010

(22) Filed: Sep. 5, 2023

(65) Prior Publication Data
US 2023/0411746 A1     Dec. 21, 2023

Related U.S. Application Data

(63) Continuation of application No. PCT/CN2021/122115, filed on Sep. 30, 2021.

(51) Int. Cl.
*H01M 50/169*     (2021.01)
*H01M 50/358*     (2021.01)

(52) U.S. Cl.
CPC ....... *H01M 50/169* (2021.01); *H01M 50/358* (2021.01); *H01M 2220/20* (2013.01)

(58) Field of Classification Search
CPC .......................... H01M 50/166; H01M 50/169
(Continued)

(56) References Cited

U.S. PATENT DOCUMENTS

2005/0153194 A1*  7/2005  Kimura ............... H01M 50/627
                                                        429/174
2014/0186692 A1*  7/2014  Kim .................. H01M 10/0422
                                                        429/185
(Continued)

FOREIGN PATENT DOCUMENTS

CN       1243605 A     2/2000
CN     103996803 A     8/2014
(Continued)

OTHER PUBLICATIONS

Written Decision on Registration issued Dec. 13, 2024 in Korean Patent Application No. 10-2023-7004433 with English translation thereof.
(Continued)

*Primary Examiner* — Allison Bourke
*Assistant Examiner* — Robert Gene West
(74) *Attorney, Agent, or Firm* — XSENSUS LLP

(57) ABSTRACT

A battery cell may include: a housing having an opening; an electrode assembly, accommodated in the housing; and an end cap, including a cap body and a protruding structure, where at least a part of the cap body may be disposed around the protruding structure and laser-welded to the housing so that the end cap fits and covers the opening. In a thickness direction of the end cap, the protruding structure may protrude from an inner surface of the cap body toward the electrode assembly, and block a laser beam during welding between the cap body and the housing. A first recess may be formed on the end cap at a position corresponding to the protruding structure, and recessed from an outer surface of the cap body toward the electrode assembly.

16 Claims, 6 Drawing Sheets

(58) Field of Classification Search
USPC .......................................................... 429/163
See application file for complete search history.

(56) References Cited

U.S. PATENT DOCUMENTS

2014/0255758 A1    9/2014  Tsutsumi et al.
2020/0235369 A1    7/2020  Jeong et al.

FOREIGN PATENT DOCUMENTS

| CN | 207896166 U |   | 9/2018 |
| CN | 208298876 U |   | 12/2018 |
| CN | 209786098 U |   | 12/2019 |
| CN | 209912942 U |   | 1/2020 |
| CN | 112993452 A |   | 6/2021 |
| CN | 113258124 A |   | 8/2021 |
| CN | 113346201 A | * | 9/2021 |
| CN | 216213942 U |   | 4/2022 |
| JP | S4917338 B1 |   | 4/1974 |
| JP | 2014160617 A |   | 9/2014 |
| JP | 2016225014 A |   | 12/2016 |
| JP | 2019-175687 A |   | 10/2019 |
| KR | 20190101372 A |   | 8/2019 |
| WO | 2013/023766 A1 |   | 2/2013 |
| WO | 2013/088724 A1 |   | 6/2013 |

OTHER PUBLICATIONS

Extended European Search Report issued Apr. 25, 2024 in European Patent Application No. 21953015.1.
Office Action issued Mar. 26, 2024 in Japanese Patent Application No. 2023-509522 with English abstract.
International Search Report and Written Opinion mailed on May 26, 2022, received for PCT Application PCT/CN2021/122115, filed on Sep. 30, 2021, 8 pages including English Translation.
Notice of the Granting of a Patent Right for an Invention issued Jun. 30, 2025 in Chinese Patent Application No. 202180081159.9 with English translation thereof.

* cited by examiner

BATTERY CELL, METHOD AND SYSTEM FOR MANUFACTURING SAME, BATTERY, AND ELECTRICAL DEVICE

CROSS-REFERENCE TO RELATED APPLICATION

The present application is a continuation of International Application No. PCT/CN2021/122115, filed Sep. 30, 2021, which is incorporated herein by reference in its entirety.

TECHNICAL FIELD

This application relates to the technical field of batteries, and more specifically, to a battery cell, a method and system for manufacturing same, a battery, and an electrical device.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

In the development of battery technology, safety is a non-negligible problem in addition to improvement of the performance of the battery cell. If the safety of the battery cell is not guaranteed, the battery cell is not suitable for use. Therefore, how to enhance the safety of the battery cell is an urgent technical problem in the battery technology.

SUMMARY

This application provides a battery cell, a method and system for manufacturing same, a battery, and an electrical device to enhance safety of the battery cell.

According to a first aspect, an embodiment of this application provides a battery cell, including:
  a housing, on which an opening is made;
  an electrode assembly, accommodated in the housing; and
  an end cap, including a cap body and a protruding portion or structure, where at least a part of the cap body is disposed around the protruding portion and configured to be laser-welded to the housing so that the end cap fits and covers the opening.

In a thickness direction of the end cap, the protruding portion protrudes from an inner surface of the cap body toward the electrode assembly, and is configured to block a laser beam during welding between the cap body and the housing.

A first recessed portion or recess is formed on the end cap at a position corresponding to the protruding portion, and is recessed from an outer surface of the cap body toward the electrode assembly. The first recessed portion is configured to release a stress during welding between the cap body and the housing.

In the foregoing technical solution, the laser beam is applied to the abutment between the housing and the cap body to weld the housing and the cap body together. The protruding portion protrudes from the inner surface of the cap body. Therefore, when the laser beam is radiated into the housing along a gap at the abutment, the protruding portion can block the laser beam, thereby reducing the risk of the laser beam burning other members. In this embodiment, a first recessed portion is further disposed on a side that is of the protruding portion and that is oriented away from the electrode assembly, so as to reduce the strength of the protruding portion. During the welding, the protruding portion can deform to release a welding stress, thereby reducing the risk of deformation and cracking of a welding region, and improving the sealing performance.

In some embodiments, the housing includes an outer end face around the opening. The outer end face of the housing is welded to the inner surface of the cap body so that the housing and the cap body are connected together.

In the foregoing technical solution, the inner surface of the cap body abuts on the outer end face, thereby reducing space occupation in the housing by the cap body. In a process of fitting the end cap onto the housing, the outer end face serves a function of limiting the position in the thickness direction of the end cap.

In some embodiments, in the thickness direction, a bottom face of the first recessed portion is closer to the electrode assembly than the entire inner surface of the cap body.

The foregoing technical solution ensures an appropriate amount by which the protruding portion protrudes from the inner surface of the cap body, so as to more effectively block the laser beam and reduce the risk of the laser beam burning the electrode assembly. In addition, on the premise of ensuring an appropriate protrusion amount of the protruding portion, this technical solution further ensures an appropriate recessing amount of the first recessed portion, so that the protruding portion can release the welding stress by deforming.

In some embodiments, the housing includes a sidewall. The sidewall extends along the thickness direction and is disposed around the electrode assembly. The protruding portion includes a blocking face oriented toward the sidewall, and the blocking face is parallel to the thickness direction and extends from the inner surface of the cap body toward the electrode assembly.

In the foregoing technical solution, during welding between the sidewall and the cap body, the laser beam is radiated onto the blocking face through the gap between the outer end face and the inner surface of the cap body. The blocking face and the sidewall are disposed parallel to each other, and can limit a reflection direction of the laser beam, thereby reducing, to some extent, the risk of burning other members in the housing by a reflected laser beam.

In some embodiments, the protruding portion further includes a guide face oriented toward the sidewall. The guide face is connected to an end that is the blocking face and that is oriented away from the inner surface of the cap body. The guide face tilts away from the sidewall against the blocking face to guide insertion of the protruding portion into the housing.

In the foregoing technical solution, by disposing a tilting guide face on the protruding portion, the protruding portion can be guided into the housing in a process of fitting the end cap onto the housing, thereby simplifying the assembling process and improving the assembling efficiency.

In some embodiments, a connecting portion is formed between a top end face of the protruding portion and a bottom face of the first recessed portion. The connecting portion is configured to be welded to a first tab of the electrode assembly.

In the foregoing technical solution, the connecting portion of the protruding portion may be directly welded to the first tab without requiring other adapters, thereby simplifying the structure of the battery cell.

In some embodiments, the cap body includes a first plate body and a second plate body. The first plate body is disposed around the protruding portion and configured to be laser-welded to the housing, and the protruding portion is disposed around the second plate body.

In the foregoing technical solution, the second plate body is disposed inside the protruding portion to increase the area of the cap body, so that an external support structure can effectively support the battery cell through the cap body, thereby enhancing structural stability of the battery cell.

In some embodiments, the battery cell further includes a current collecting member or structure. The current collecting member is configured to electrically connect a first tab of the electrode assembly and the end cap.

The protruding portion protrudes from the cap body. Therefore, the protruding portion separates the cap body from the first tab in the thickness direction. If the end cap and the first tab are directly connected, the first tab can be connected just to the protruding portion of the end cap. In this way, the region of the first tab, from which the current can be directly transmitted, is restricted by the protruding portion. In the foregoing technical solution, the first tab and the end cap are connected by a current collecting member. In this way, the region of the first tab, from which the current can be directly transmitted, is no longer restricted by the protruding portion. The current of the first tab can flow together into the end cap through the current collecting member. In this way, the current collecting member can reduce the difference of paths along which different regions of the first tab conduct electricity to the end cap, improve uniformity of a current density of a first electrode plate, reduce an internal resistance, and increase a flow capacity and charging efficiency of the battery cell.

In some embodiments, the current collecting member includes a first current collecting portion or structure and a second current collecting portion or structure connected to the first current collecting portion. The first current collecting portion is configured to be connected to the first tab so that the current collecting member is electrically connected to the first tab. The second current collecting portion surrounds the first current collecting portion. The second current collecting portion is configured to be connected to at least one of the protruding portion or the second plate body so that the current collecting member is electrically connected to the end cap.

In some embodiments, the first current collecting portion is located between the second plate body and the first tab and welded to the first tab, and the second current collecting portion is located between the first tab and the protruding portion and welded to the protruding portion.

In the foregoing technical solution, during assembling of the end cap and the current collecting member, the laser beam may be applied to the surface that is of the protruding portion and that is oriented away from the second current collecting portion, so as to weld the protruding portion and the second current collecting portion from the outside.

In some embodiments, the current collecting member is flat plate-shaped.

In the foregoing technical solution, the flat plate-shaped current collecting member is easier to form. The flat plate-shaped current collecting member can be entirely in contact with the first tab, thereby increasing a flow area, enabling the current collecting member to support the first tab more evenly, and reducing the risk of offset and misalignment of the electrode plate of the electrode assembly in the thickness direction.

In some embodiments, the protruding portion supports the electrode assembly through the current collecting member.

In the foregoing technical solution, the protruding portion can support the electrode assembly through the first current collecting portion and the second current collecting portion, so as to reduce the risk of offset and misalignment of the electrode plate of the electrode assembly in the thickness direction.

In some embodiments, the current collecting member is located between the second plate body and the first tab, and the protruding portion surrounds the current collecting member.

In the foregoing technical solution, the protruding portion does not overlap the current collecting member in the thickness direction, thereby reducing space occupation by the end cap and the current collecting member in the thickness direction and increasing the energy density.

In some embodiments, the second current collecting portion is welded to the second plate body, and the first current collecting portion is welded to the first tab. The welding reduces a contact resistance between the second current collecting portion and the second plate body, and a contact resistance between the first current collecting portion and the first tab, and improves the flow capacity.

In some embodiments, the first current collecting portion is disposed protrusively on a surface that is of the second current collecting portion and that is oriented toward the electrode assembly. A second recessed portion is formed on the current collecting member at a position corresponding to the first current collecting portion, and is recessed toward the electrode assembly from a surface that is of the second current collecting portion and that is oriented away from the electrode assembly.

In the foregoing solution, the first current collecting portion is disposed protrusively on the second current collecting portion and abuts on the first tab, so as to separate the first tab from the second current collecting portion. In this way, during welding between the second plate body and the second current collecting portion, the heat transferred to the electrode assembly is reduced, and the risk of burning the separator of the electrode assembly is reduced. In this technical solution, the thickness of the first current collecting portion is reduced by the second recessed portion, thereby reducing the welding power required for welding the first current collecting portion to the first tab, reducing heat emission, and reducing the risk of burning other members.

In some embodiments, both the protruding portion and the first current collecting portion support the electrode assembly.

In the foregoing technical solution, the first current collecting portion supports a middle region of the first tab, and the protruding portion supports an edge region of the first tab, thereby improving uniformity of the force on the first tab and reducing the risk of offset and misalignment of the electrode plate of the electrode assembly in the thickness direction.

In some embodiments, a pressure relief mechanism or structure connected to the second plate body is disposed on the end cap, and the pressure relief mechanism is configured to be actuated when an internal pressure of the battery cell reaches a threshold, so as to release the internal pressure; and In the thickness direction, the first current collecting portion is disposed opposite to the pressure relief mechanism, and an avoidance clearance exists between the first current collecting portion and the pressure relief mechanism.

In the foregoing technical solution, the avoidance clearance is disposed between the first current collecting portion and the pressure relief mechanism to reduce the risk that the first current collecting portion crushes the pressure relief mechanism, and to ensure smooth degassing when the pressure relief mechanism is actuated, and in turn, reduce the safety hazards.

In some embodiments, the electrode assembly is a jelly-roll structure, and a first through-hole is made at a winding center of the electrode assembly. A second through-hole is made in the first current collecting portion, and the second through-hole is disposed opposite to the first through-hole, so as to make the first through-hole communicate with the avoidance clearance.

In the foregoing technical solution, when the electrode assembly is thermally runaway, high-temperature and high-pressure materials can quickly enter the avoidance clearance through the first through-hole and the second through-hole, and act on the pressure relief mechanism, so that the pressure relief mechanism can be actuated in time to reduce safety hazards.

In some embodiments, the first tab of the electrode assembly is electrically connected to the housing by the end cap.

In the foregoing technical solution, the housing is connected to the first tab of the electrode assembly by the end cap, so that the potential of the housing is basically the same as the potential of the first tab. In this way, the housing itself may serve as an output electrode of the battery cell, thereby saving a conventional electrode terminal and simplifying the structure of the battery cell.

In some embodiments, the housing further includes a sidewall and a bottom wall connected to the sidewall. The sidewall extends along the thickness direction and is disposed around the electrode assembly. An electrode lead-out hole is disposed on the bottom wall. The battery cell further includes an electrode terminal mounted in the electrode lead-out hole. The electrode terminal is electrically connected to a second tab of the electrode assembly, and the first tab and the second tab are of opposite polarities and located at two ends of the electrode assembly respectively.

In the foregoing solution, the bottom wall and the electrode terminal may serve as two output electrodes of the battery cell, thereby simplifying the structure of the battery cell and ensuring a high flow capacity of the battery cell. The bottom wall and the electrode terminal are located at the same end of the battery cell. In this way, the busbar component can be assembled onto the same side of the battery cell, thereby simplifying the assembling process and improving the efficiency of assembling a plurality of battery cells into groups.

In some embodiments, the bottom wall and the sidewall are a one-piece structure. This embodiment avoids the step of connecting the bottom wall and the sidewall, and reduces the resistance between the bottom wall and the sidewall.

In some embodiments, the first tab is a negative tab, and a substrate material of the housing is steel.

In the foregoing technical solution, the housing is electrically connected to the negative tab. That is, the housing is in a low-potential state. The steel housing in the low-potential state is not prone to corrosion by an electrolytic solution, thereby reducing safety hazards.

In some embodiments, a substrate material of the housing is identical to a substrate material of the end cap.

In the foregoing technical solution, the substrate material of the housing is identical to the substrate material of the end cap, thereby facilitating welding between the housing and the end cap, increasing the connection strength between the housing and the end cap, and ensuring high airtightness of the battery cell.

In some embodiments, the battery cell is a cylindrical cell.

According to a second aspect, an embodiment of this application provides a battery, including a plurality of battery cells according to any embodiment in the first aspect.

According to a third aspect, an embodiment of this application provides an electrical device, including the battery according to the second aspect. The battery is configured to provide electrical energy.

According to a fourth aspect, an embodiment of this application provides a method for manufacturing a battery cell, including:

providing a housing, where an opening is made on the housing;

providing an electrode assembly, and mounting the electrode assembly into the housing;

providing an end cap, where the end cap includes a cap body and a protruding portion, at least a part of the cap body is disposed around the protruding portion, the protruding portion protrudes from an inner surface of the cap body in a thickness direction of the end cap, and a first recessed portion that is recessed against an outer surface of the cap body is formed on the end cap at a position corresponding to the protruding portion; and leaving the cap body to abut against the housing, and then radiating a laser beam onto an abutment between the cap body and the housing to weld the cap body to the housing so that the end cap fits and covers the opening.

The protruding portion protrudes from an inner surface of the cap body toward the electrode assembly, and is configured to block the laser beam during welding between the cap body and the housing; and the first recessed portion is recessed from an outer surface of the cap body toward the electrode assembly and configured to release a stress during welding between the cap body and the housing.

According to a fifth aspect, an embodiment of this application provides a system for manufacturing a battery cell, including:

a first providing apparatus, configured to provide a housing, where an opening is made on the housing;

a second providing apparatus, configured to provide an electrode assembly, and mount the electrode assembly into the housing;

a third providing apparatus, configured to provide an end cap, where the end cap includes a cap body and a protruding portion, at least a part of the cap body is disposed around the protruding portion, the protruding portion protrudes from an inner surface of the cap body in a thickness direction of the end cap, and a first recessed portion that is recessed against an outer surface of the cap body is formed on the end cap at a position corresponding to the protruding portion; and an assembling apparatus, configured to leave the cap body to abut against the housing, and then radiate a laser beam onto an abutment between the cap body and the housing to weld the cap body to the housing so that the end cap fits and covers the opening.

The protruding portion protrudes from an inner surface of the cap body toward the electrode assembly, and is configured to block the laser beam during welding between the cap body and the housing; and the first recessed portion is recessed from an outer surface of the cap body toward the electrode assembly and configured to release a stress during welding between the cap body and the housing.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
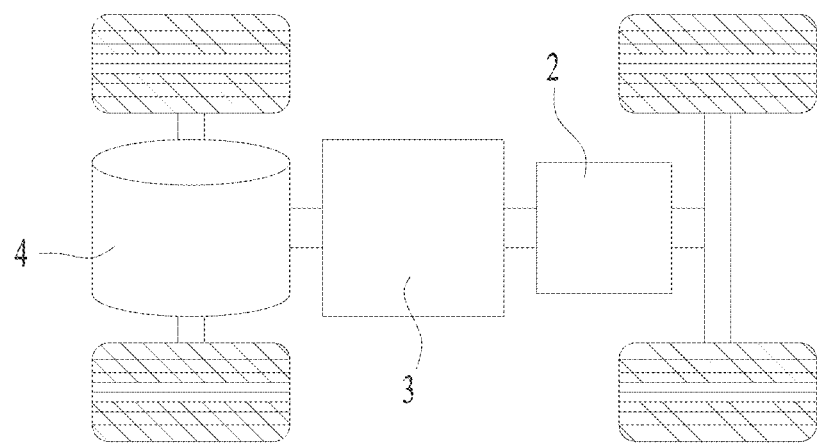
FIG. 1 is a schematic structural diagram of a vehicle according to some embodiments of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as commonly understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in a cylindrical shape, a flat shape, a cuboidal shape, or other shapes, without being limited in embodiments of this application.

The battery mentioned in embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. The positive active material layer overlays a surface of the positive current collector. The positive current collector includes a positive current collecting portion and a positive tab connected to the positive current collecting portion. The positive current collecting portion is coated with a positive active material layer, and the positive tab is not coated with the positive active material layer. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer overlays a surface of the negative current collector. The negative current collector includes a negative current collecting portion and a negative tab connected to the negative current collecting portion. The negative current collecting portion is coated with a negative active material layer, and the negative tab is not coated with the negative active material layer. The negative current collector may be made of copper. The negative active material layer includes a negative active material. The negative active material may be carbon, silicon, or the like. The separator may be made of a material such as PP (polypropylene, polypropylene) or PE (polyethylene, polyethylene).

The battery cell further includes a housing and an end cap. An opening is made on the housing, and the housing is configured to accommodate the electrode assembly. The electrode assembly may be fitted into the housing through the opening of the housing. The end cap is configured to fit and cover the opening of the housing to implement sealing.

The inventor of this application connects the end cap to the housing by laser welding. Specifically, the inventor tries letting the end cap abut the housing, and then radiates a laser beam onto the abutment between the end cap and the housing. Under the action of the laser beam, the abutment between the end cap and the housing is melted and connected together. However, the inventor finds that a gap may exist at the abutment between the end cap and the housing. The laser beam may be applied to other members in the housing after passing through the gap, thereby causing safety hazards. In addition, a welding stress is generated during welding. The welding stress is unable to be effectively released, so that a welding region resulting from the welding is prone to deform and crack, thereby impairing the sealing performance.

In view of this, an embodiment of this application provides a technical solution. According to this technical solution, a protruding portion is disposed on the end cap to block the laser beam during welding between the end cap and the housing and reduce the risk of burning other members by the laser beam. In this embodiment, a first recessed portion is further disposed on a side that is of the protruding portion and that is oriented away from the electrode assembly, so as to reduce the strength of the protruding portion. During the welding, the protruding portion can deform to release the welding stress, thereby reducing the risk of deformation and cracking of the welding region, and improving the sealing performance.

The technical solution described in this embodiment of this application is applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

For ease of description in the following embodiments, a vehicle is used as an example of the electrical device.

FIG. 1 is a schematic structural diagram of a vehicle according to some embodiments of this application.

As shown in FIG. 1, a battery 2 is disposed inside the vehicle 1. The battery 2 may be disposed at the bottom, front, or rear of the vehicle 1. The battery 2 may be configured to supply power to the vehicle 1. For example, the battery 2 may serve as an operating power supply of the vehicle 1.

The vehicle 1 may further include a controller 3 and a motor 4. The controller 3 is configured to control the battery 2 to supply power to the motor 4, for example, to start or navigate the vehicle 1, or meet the operating power requirements of the vehicle in operation.

In some embodiments of this application, the battery 2 serves not only as an operating power supply of the vehicle 1, but may also serve as a drive power supply of the vehicle 1 to provide driving power for the vehicle 1 in place of or partly in place of oil or natural gas.

Figure 2:
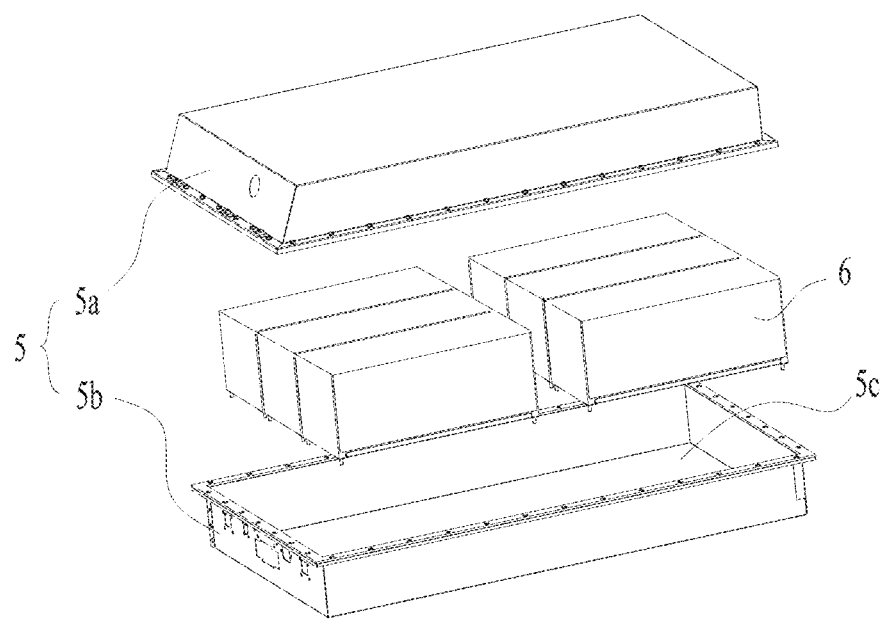
FIG. 2 is a schematic exploded view of a battery according to some embodiments of this application.

FIG. 2 is a schematic exploded view of a battery according to some embodiments of this application. As shown in FIG. 2, the battery 2 includes a box 5 and a battery cell. The battery cell is accommodated in the box 5.

The box 5 is configured to accommodate the battery cell. The box 5 may be one of various structures. In some embodiments, the box 5 may include a first box portion 5a and a second box portion 5b. The first box portion 5a and the second box portion 5b fit and cover each other. The first box portion 5a and the second box portion 5b together define an accommodation space 5c configured to accommodate the battery cell. The second box portion 5b may be a hollowed-out structure that is opened at one end. The first box portion 5a is a plate-like structure. The first box portion 5a fits on the opening side of the second box portion 5b to form the box 5 that includes the accommodation space 5c. The first box portion 5a and the second box portion 5b each may be a hollowed-out structure that is opened at one end. The opening end of the first box portion 5a fits on the opening end of the second box portion 5b, so as to form the box 5 with the accommodation space 5c. Definitely, the first box portion 5a and the second box portion 5b may be in various shapes, such as a cylinder or a cuboid.

To improve airtightness between the first box portion 5a and the second box portion 5b that are connected, a sealing element such as a sealant or a sealing ring may be disposed between the first box portion 5a and the second box portion 5b.

Assuming that the first box portion 5a fits on the top of the second box portion 5b, the first box portion 5a may also be referred to as an upper box, and the second box portion 5b may also be referred to as a lower box.

There may be one or more battery cells in the battery 2. If there are a plurality of battery cells, the plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box 5. Alternatively, the plurality of battery cells may be connected in series, parallel, or series-and-parallel pattern to form a battery module 6, and then a plurality of battery modules 6 are connected in series, parallel, or series-and-parallel pattern to form a whole for being accommodated in the box 5.

Figure 3:
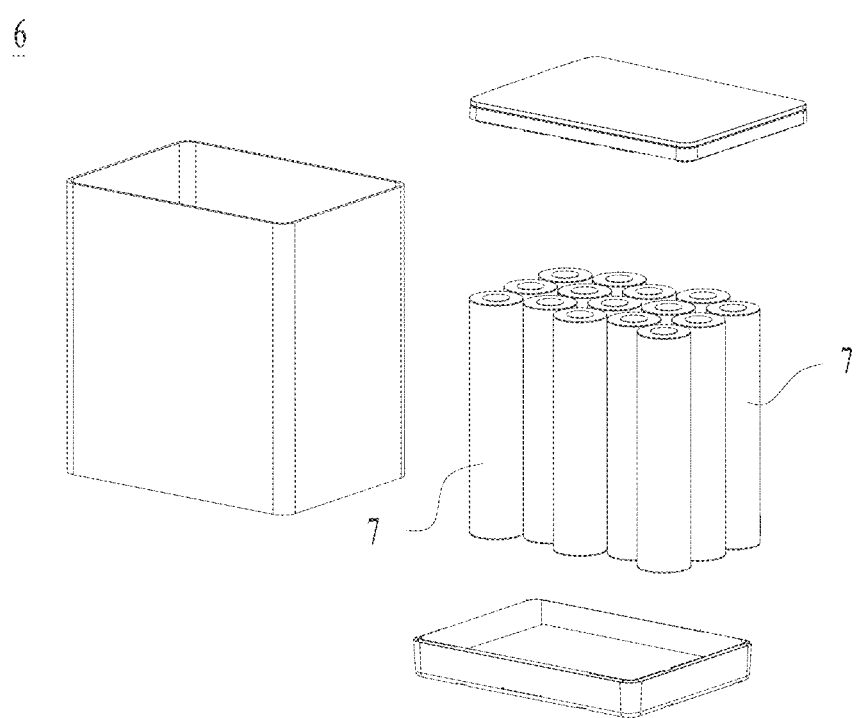
FIG. 3 is a schematic exploded view of the battery module shown in FIG. 2.

FIG. 3 is a schematic exploded view of the battery module shown in FIG. 2.

In some embodiments, as shown in FIG. 3, there are a plurality of battery cells 7. The plurality of battery cells 7 are connected in series, parallel, or series-and-parallel pattern to form a battery module 6 first. A plurality of battery modules 6 are then connected in series, parallel, or series-and-parallel pattern to form a whole for being accommodated in the box.

The plurality of battery cells 7 in the battery module 6 may be electrically connected by a busbar component, so as to implement parallel connection, series connection, or series-parallel connection between the plurality of battery cells 7 in the battery module 6.

Figure 4:
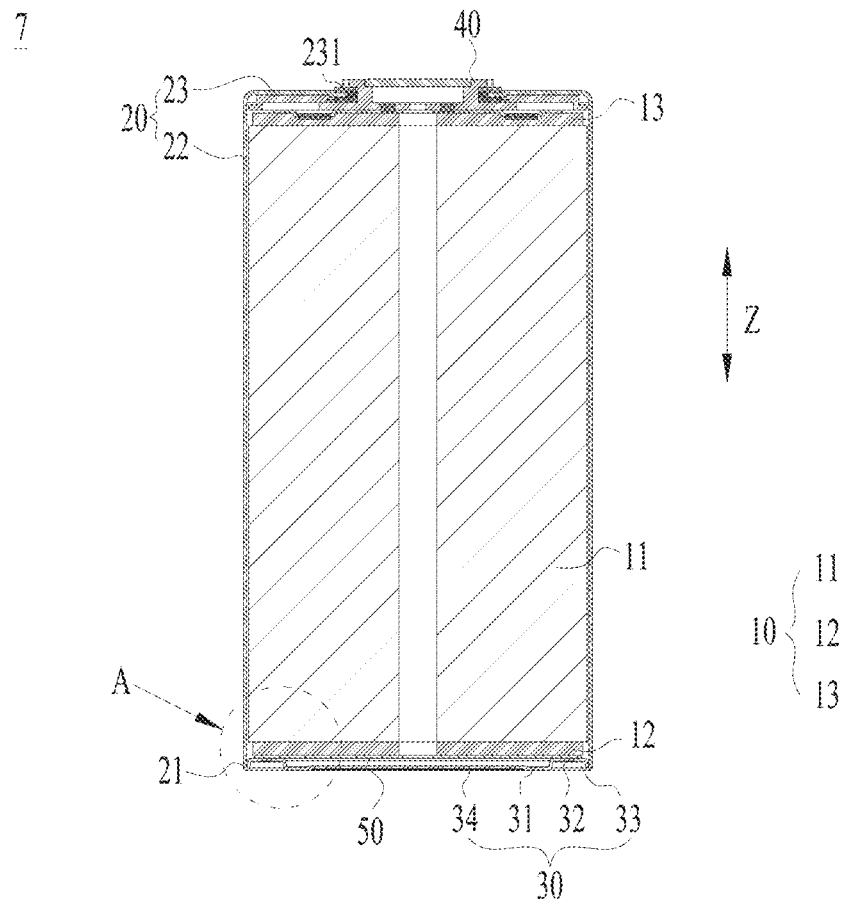
FIG. 4 is a schematic sectional view of a battery cell according to some embodiments of this application.
Figure 5:
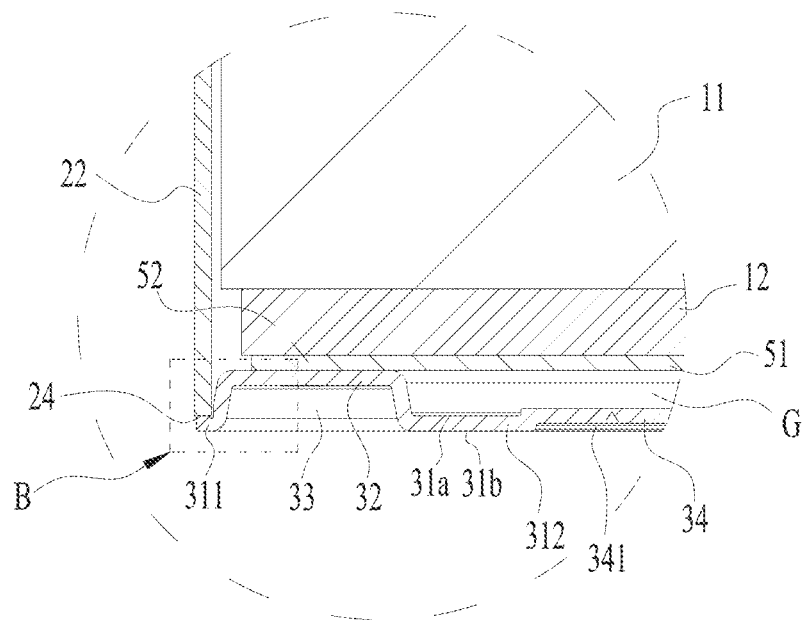
FIG. 5 is a schematic close-up view of a circled position A of the battery cell shown in FIG. 4.

FIG. 4 is a schematic sectional view of a battery cell according to some embodiments of this application; FIG. 5 is a schematic close-up view of a circled position A of the battery cell shown in FIG. 4; and FIG. 6 is a schematic close-up view of a rectangular position B of the battery cell shown in FIG. 5.

Figure 6:
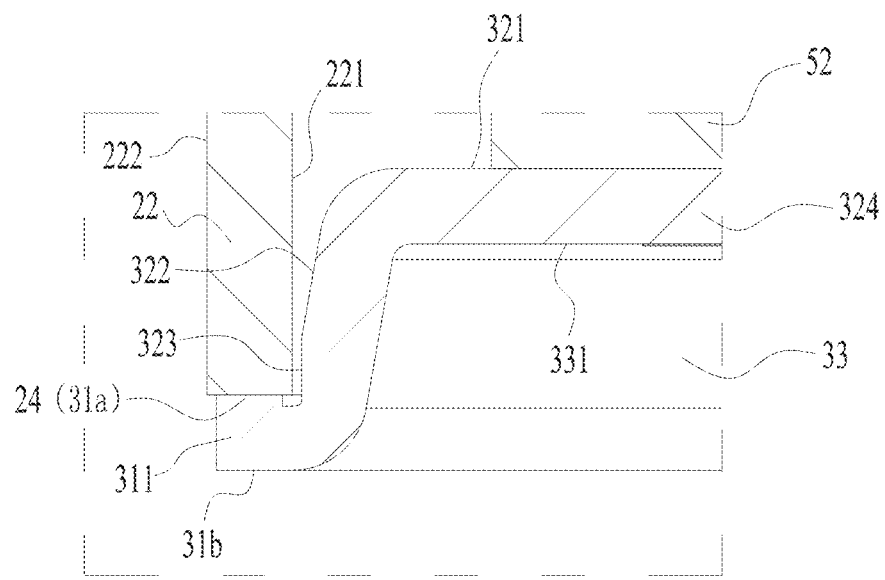
FIG. 6 is a schematic close-up view of a rectangular position B of the battery cell shown in FIG. 5.

As shown in FIG. 4 to FIG. 6, the battery cell 7 according to an embodiment of this application includes: a housing 20, on which an opening 21 is made; an electrode assembly 10, accommodated in the housing 20; and an end cap 30, including a cap body 31 and a protruding portion 32, where at least a part of the cap body 31 is disposed around the protruding portion 32 and configured to be laser-welded to the housing 20 so that the end cap 30 fits and covers the opening 21. In a thickness direction Z of the end cap 30, the protruding portion 32 protrudes from an inner surface 31a of the cap body toward the electrode assembly 10, and is configured to block a laser beam during welding between the cap body 31 and the housing 20. A first recessed portion 33 is formed on the end cap 30 at a position corresponding to the protruding portion 32, and is recessed from an outer surface 31b of the cap body toward the electrode assembly 10. The first recessed portion 33 is configured to release a stress during welding between the cap body 31 and the housing 20.

The electrode assembly 10 includes a first electrode plate, a second electrode plate, and a separator. The separator is configured to separate the first electrode plate from the second electrode plate. The first electrode plate and the second electrode plate are of opposite polarities. In other words, one of the first electrode plate or the second electrode plate is a positive electrode plate, and the other of the first electrode plate or the second electrode plate is a negative electrode plate.

Optionally, the first electrode plate, the second electrode plate, and the separator are all ribbon-shaped structures. The first electrode plate, the second electrode plate, and the separator are wound into one piece to form a jelly-roll structure. The jelly-roll structure may be a cylindrical structure, a flat structure, or other shaped structures.

Viewed from the appearance of the electrode assembly 10, the electrode assembly 10 includes a body portion 11, a first tab 12, and a second tab 13. The first tab 12 and the second tab 13 protrude from the body portion 11. The first tab 12 is a part uncoated with the active material layer on the first electrode plate, and the second tab 13 is a part uncoated with the active material layer on the second electrode plate. Correspondingly, one of the first tab 12 or the second tab 13 is a positive tab, and the other is a negative tab.

The first tab 12 and the second tab 13 may extend from the same end of the body portion 11, or extend from two opposite ends of the body portion respectively.

Illustratively, the first tab 12 and the second tab 13 are disposed at two ends of the body portion 11 respectively. In other words, the first tab 12 and the second tab 13 are disposed at the two ends of the electrode assembly 10 respectively. Optionally, the first tab 12 is located on the electrode assembly 10 at an end oriented toward the end cap 30. The second tab 13 is located on the electrode assembly 10 at an end oriented away from the end cap 30.

Optionally, the first tab 12 is wound around a central axis of the electrode assembly 10 in a plurality of circles. In other words, the first tab 12 includes a plurality of tab layers. After completion of the winding, the first tab 12 is in the shape of a column approximately, and a gap is left between two adjacent tab layers. In this embodiment of this application, the first tab 12 may be processed to reduce the gap between the tab layers and facilitate the connection between the first tab 12 and other conductive structures. For example, in this embodiment of this application, the first tab 12 may be kneaded and flattened, so that an end region that is of the first tab 12 and that is far away from the body portion 11 can be tucked and collected together. The kneading and flattening lead to formation of a densified end face at the end that is of the first tab 12 and that is far away from the body portion 11, thereby reducing the gap between the tab layers and facilitating the connection between the first tab 12 and other conductive structures. Alternatively, in this embodiment of this application, a conductive material may fill the gap between the two adjacent tab layers to reduce the gap between the tab layers.

Optionally, the second tab 13 is wound around the central axis of the electrode assembly 10 in a plurality of circles, so that the second tab 13 includes a plurality of tab layers. Illustratively, the second tab 13 is also kneaded and flattened to reduce the gap between the tab layers of the second tab 13.

The housing 20 is a hollowed-out structure opened at one end. The end cap fits on, and is hermetically connected to, the opening of the housing 20, to form an accommodation cavity configured to accommodate the electrode assembly 10 and the electrolytic solution.

The housing 20 is a structure hollowed out to form a space configured to accommodate the electrode assembly 10. The housing 20 may be in various shapes such as a cylinder or cuboid. The shape of the housing 20 may be determined depending on the specific shape of the electrode assembly 10. For example, if the electrode assembly is a cylindrical structure, the housing may be a cylindrical housing. If the electrode assembly 10 is a cuboidal structure, the housing may be a cuboidal housing.

The housing 20 may be positively charged, negatively charged, or uncharged. To make the housing 20 charged, the housing 20 may be directly connected to the tab of the electrode assembly 10, or may be electrically connected to the tab through other conductive members.

The end cap 30 and the housing 20 are connected by welding, and the end cap 30 and the housing 20 may be of the same polarity. Illustratively, to make the housing 20 positively charged, the housing 20 may be electrically connected to the positive tab by using the end cap 30. To make the housing 20 negatively charged, the housing 20 may be electrically connected to the negative tab by using the end cap 30. Definitely, the housing 20 may be connected to the tab by other conductive structures instead, without being limited in this embodiment.

The housing 20 and the end cap 30 may be made of the same material, or made of different materials, as long as the housing and the end cap can be connected by laser welding.

The end cap 30 may be electrically connected to the electrode assembly 10, or may be insulated from the electrode assembly 10. Optionally, the end cap 30 is electrically connected to the first tab 12. Definitely, the end cap 30 may be directly electrically connected to the first tab 12, or may be electrically connected to the first tab 12 by other members.

The cap body 31 is a plate-like structure, and includes an inner surface and an outer surface that are disposed opposite to each other along the thickness direction of the cap body. The inner surface 31a of the cap body faces the electrode assembly 10. Optionally, the inner surface 31a of the cap body and the outer surface 31b of the cap body are both flat faces and parallel to each other.

The protruding portion 32 protrudes toward the electrode assembly 10 against the inner surface 31a of the cap body, so that at least a part of the protruding portion 32 protrudes from the inner surface 31a of the cap body. This embodiment does not limit the amount by which the protruding portion 32 protrudes from the inner surface 31a of the cap body.

The position of the first recessed portion 33 corresponds to the position of the protruding portion 32. The first recessed portion 33 is recessed toward the electrode assembly 10 against the outer surface 31b of the cap body. The first recessed portion 33 reduces the strength of the protruding portion 32, so that the region corresponding to the protruding portion 32 on the end cap 30 is more elastic.

The cap body 31 may entirely surround the protruding portion 32, or may just partly surround the protruding portion 32. For example, the protruding portion 32 may be an annular structure, and the cap body 31 further includes a part surrounded by the protruding portion 32.

During the laser welding, the laser beam is applied to the abutment between the housing 20 and the cap body 31 to weld the housing 20 and the cap body 31 together. Due to a fit error, a tiny gap may exist at the abutment between the housing 20 and the cap body 31. The laser beam can easily pass through the gap and irradiate the interior of the housing 20, thereby bringing the risk of burning other members in the housing (such as the electrode assembly 10). The protruding portion 32 protrudes from the inner surface 31a of the cap body. Therefore, when the laser beam is radiated into the housing 20 along the gap at the abutment, the protruding portion 32 can block the laser beam, thereby reducing the risk of the laser beam burning other members.

During welding between the cap body 31 and the housing 20, a welding stress is generated on the cap body 31, and the welding stress is transmitted to the protruding portion 32. In this embodiment of this application, a first recessed portion 33 is further disposed on a side that is of the protruding portion 32 and that is oriented away from the electrode assembly 10, so as to reduce the strength of the protruding portion 32. During the welding, the protruding portion 32 can deform to release a welding stress, thereby reducing the risk of deformation and cracking of a welding region, and improving the sealing performance.

In some embodiments, the first tab 12 of the electrode assembly 10 is electrically connected to the housing 20 by the end cap 30.

The end cap 30 may be directly connected to the first tab 12. For example, the end cap 30 may be directly welded to the first tab 12 to implement electrical connection between the end cap 30 and the first tab 12. Alternatively, the end cap 30 may be indirectly connected to the first tab 12 by other conductive structures (such as a current collecting member to be mentioned later) instead. Understandably, in this embodiment, the protruding portion 32 may be connected to the conductive structure, and the cap body 31 may also be connected to the conductive structure.

In this embodiment, the housing 20 is connected to the first tab 12 of the electrode assembly 10 by the end cap 30, so that the potential of the housing 20 is basically the same as the potential of the first tab 12. In this way, the housing 20 itself may serve as an output electrode of the battery cell 7, thereby saving a conventional electrode terminal and simplifying the structure of the battery cell 7.

When a plurality of battery cells 7 are assembled into a group, the housing may be electrically connected to a busbar component, thereby not only increasing the flow area, but also making the structural design of the busbar component more flexible.

In some embodiments, the housing 20 further includes a sidewall 22 and a bottom wall 23 connected to the sidewall 22. The sidewall 22 extends along the thickness direction Z and is disposed around the electrode assembly 10. An electrode lead-out hole 231 is disposed on the bottom wall 23. The battery cell 7 further includes an electrode terminal 40 mounted in the electrode lead-out hole 231. The electrode terminal 40 is electrically connected to a second tab 13 of the electrode assembly 10, and the first tab 12 and the second tab 13 are of opposite polarities and located at two ends of the electrode assembly 10 respectively.

The sidewall 22 and the bottom wall 23 may be an integrally formed structure. That is, the housing 20 is an integrally formed member. Definitely, the sidewall 22 and the bottom wall 23 may be two stand-alone members provided separately, and may be connected together by welding, riveting, bonding, or other means.

An opening 21 of the housing 20 is formed at one end of the sidewall 22. The bottom wall 23 is connected to the other end that is of the sidewall 22 and that is oriented away from the opening 21. The sidewall 22 is a cylindrical structure. For example, the sidewall 22 is a cylinder or a rectangular column. The bottom wall 23 is a plate-like structure, the shape of which corresponds to the shape of the sidewall 22.

The second tab 13 may be directly electrically connected to the electrode terminal 40, or may be indirectly electrically connected to the electrode terminal 40 by other conductive structures.

The electrode terminal 40 is dielectrically disposed on the bottom wall 23. The electrode terminal 40 and the bottom wall 23 may be of different polarities. The electrode terminal 40 and the bottom wall 23 may serve as two output electrodes of the battery cell 7 respectively. Optionally, the battery cell further includes an insulation piece. At least a part of the insulation piece is located between the bottom wall 23 and the electrode terminal 40, so as to insulate the bottom wall 23 from the electrode terminal 40.

In a case that the first tab 12 is a negative tab and the second tab 13 is a positive tab, the bottom wall 23 is a negative output electrode of the battery cell 7, and the electrode terminal 40 is a positive output electrode of the battery cell 7. In a case that the first tab 12 is a positive tab and the second tab 13 is a negative tab, the bottom wall 23 is a positive output electrode of the battery cell 7, and the electrode terminal 40 is a negative output electrode of the battery cell 7.

The electrode terminal 40 is fixed onto the bottom wall 23. The electrode terminal 40 may be fixed as a whole onto the outer side of the bottom wall 23, or may extend into the interior of the housing 20 through the electrode lead-out hole 231.

The first tab 12 is located on the electrode assembly 10 at an end oriented toward the end cap 30, so as to facilitate electrical connection between the end cap 30 and the first tab 12. Correspondingly, the second tab 13 is located on the electrode assembly 10 at an end oriented toward the bottom wall 23, so as to facilitate electrical connection between the electrode terminal 40 and the second tab 13. In this embodiment of this application, the first tab 12 and the second tab 13 are disposed at the two ends of the electrode assembly 10 respectively, thereby reducing the risk of conduction between the first tab 12 and the second tab 13, and increasing the passage area of both the first tab 12 and the second tab 13.

In this embodiment, the bottom wall 23 and the electrode terminal 40 may serve as two output electrodes of the battery cell 7, thereby simplifying the structure of the battery cell 7 and ensuring a high flow capacity of the battery cell 7. The bottom wall 23 and the electrode terminal 40 are located at the same end of the battery cell 7. In this way, the busbar component can be assembled onto the same side of the battery cell 7, thereby simplifying the assembling process and improving the efficiency of assembling a plurality of battery cells 7 into groups.

In some embodiments, the bottom wall 23 and the sidewall 22 are a one-piece structure. This embodiment avoids the step of connecting the bottom wall 23 and the sidewall 22, and reduces the resistance between the bottom wall and the sidewall. For example, the housing 20 may be formed by a stretching process.

The electrode lead-out hole 231 in this embodiment of this application is made after the housing 20 is formed by stretching.

The inventor hereof has tried an opening end of a housing that is made by calendering, so that the opening end of the housing is folded inward to form a flanged structure. The flanged structure presses the end cap to fix the end cap. The inventor mounts the electrode terminal onto the end cap, and uses the flanged structure and the electrode terminal as the two output electrodes of the battery cell respectively. However, the larger the size of the flanged structure, the higher the risk of curling and wrinkling the flanged structure incurs after the flanged structure is formed. The curling and wrinkling of the flanged structure lead to a bumpy surface of the flanged structure and, when the flanged structure is welded to the busbar component, result in poor welding. Therefore, the size of the flanged structure is relatively limited, resulting in an insufficient flow capacity of the battery cell.

In this embodiment, an electrode lead-out hole 231 configured to mount the electrode terminal 40 is formed on the bottom wall 23 by a hole-opening process, so as to dispose the positive output electrode and the negative output electrode on the battery cell 7 at an end oriented away from the opening 21. The bottom wall 23 is formed during the formation of the housing 20, so as to ensure flatness of the bottom wall 23 and high connection strength between the bottom wall 23 and the busbar component after the electrode lead-out hole 231 is made. At the same time, the flatness of the bottom wall 23 is not restricted by the size of the bottom wall. Therefore, the size of the bottom wall 23 may be relatively large, thereby improving the flow capacity of the battery cell 7.

In some embodiments, the first tab 12 is a negative tab, and a substrate material of the housing 20 is steel.

The housing 20 is electrically connected to the negative tab. That is, the housing 20 is in a low-potential state. The steel housing 20 in the low-potential state is not prone to corrosion by an electrolytic solution, thereby reducing safety hazards.

In some embodiments, the housing 20 further includes a protection layer disposed on the surface of the substrate material. Optionally, the protection layer is a nickel layer electrodeposited on the surface of the substrate material.

In some embodiments, the substrate material of the housing 20 is identical to the substrate material of the end cap 30. Optionally, both the substrate material of the housing 20 and the substrate material of the end cap 30 are steel.

In this embodiment, the substrate material of the housing 20 is identical to the substrate material of the end cap 30, thereby facilitating welding between the housing 20 and the end cap 30, increasing the connection strength between the housing and the end cap, and ensuring high airtightness of the battery cell 7.

In some embodiments, the battery cell 7 is a cylindrical cell. Correspondingly, the electrode assembly 10 is a cylindrical structure, and the housing 20 is a cylindrical hollowed-out structure.

In some embodiments, the sidewall 22 of the housing 20 and the cap body 31 are arranged along the thickness direction Z of the end cap 30. During welding between the sidewall 22 and the cap body 31, the laser beam is applied to the abutment between the sidewall 22 and the cap body 31. At least a part of the cap body 31 and at least a part of the sidewall 22 are melted and connected together.

In some embodiments, the housing 20 includes an outer end face 24 at the opening end, and the outer end face 24 is disposed around the opening 21 of the housing 20. The outer end face 24 is an end face of the sidewall 22 at an end away from the bottom wall 23. Optionally, the outer end face 24 is a flat face.

The outer end face 24 of the housing 20 is at an angle to the thickness direction Z of the end cap 30. Optionally, the outer end face 24 of the housing 20 is perpendicular to the thickness direction Z of the end cap 30.

The sidewall 22 of the housing 20 includes an inner surface and an outer surface disposed opposite to each other. The inner surface 221 of the sidewall faces the electrode assembly 10. Both the inner surface 221 of the sidewall and the outer surface 222 of the sidewall are annular faces. The outer end face 24 connects the inner surface 221 of the sidewall and the outer surface 222 of the sidewall. Optionally, the outer end face 24 is perpendicular to the inner surface 221 of the sidewall and the outer surface 222 of the sidewall.

The inner surface 31a of the cap body may abut on the outer end face 24. Definitely, in an alternative embodiment, the inner surface of the cap body may abut on another surface of the housing 20 instead. For example, the sidewall 22 further includes a stepped face that is recessed inward against the outer end face 24 and that is connected to the inner surface 221 of the sidewall. The stepped face may abut and fit the inner surface 31a of the cap body.

In some embodiments, the housing 20 includes an outer end face 24 around the opening 21. The outer end face 24 of the housing 20 is welded to the inner surface 31a of the cap body so that the housing 20 and the cap body 31 are connected together.

The inner surface 31a of the cap body and the outer end face 24 are disposed parallel to each other. The inner surface 31a of the cap body fits snugly with the outer end face 24 in the thickness direction Z. The laser beam is radiated at a junction between the outer end face 24 and the inner surface 31a of the cap body during welding.

After the welding, at least a part of the inner surface 31a of the cap body and at least a part of the outer end face 24 are melted and connected together.

The outer end face 24 is located at the outermost end of the housing 20. In this embodiment, the inner surface 31a of the cap body abuts on the outer end face 24, thereby reducing space occupation in the housing 20 by the cap body 31. In a process of fitting the end cap 30 onto the housing 20, the outer end face 24 serves a function of limiting the position in the thickness direction Z of the end cap 30.

In some embodiments, in the thickness direction Z, a bottom face 331 of the first recessed portion 33 is closer to the electrode assembly 10 than the entire inner surface 31a of the cap body.

The first recessed portion 33 and the protruding portion 32 may be formed by stamping the end cap 30.

The greater the depth of the first recessed portion 33 along the thickness direction Z, the larger the amount by which the protruding portion 32 protrudes from the inner surface 31a of the cap body.

This embodiment of this application ensures an appropriate amount by which the protruding portion 32 protrudes from the inner surface 31a of the cap body, so as to more effectively block the laser beam and reduce the risk of the laser beam burning the electrode assembly 10. In addition, on the premise of ensuring an appropriate protrusion amount of the protruding portion 32, this embodiment of this application further ensures an appropriate recessing amount of the first recessed portion 33, so that the protruding portion 32 can release the welding stress by deforming.

In some embodiments, the protruding portion 32 includes a top end face 321 and an outer side face oriented toward the sidewall 22. The outer side face is an annular face disposed around the top end face 321. The top end face 321 is a surface that is of the protruding portion 32 and that is oriented toward the electrode assembly 10. The outer side face is oriented toward the sidewall 22 and is configured to block a laser beam. Optionally, a clearance may be provided between the outer side face and the inner surface 221 of the sidewall. The clearance facilitates insertion of the protruding portion 32 into the housing 20 through the opening 21 of the housing 20.

The outer side face may further include a part that tilts against the inner surface 221 of the sidewall. The tilting part serves a function of guiding the insertion of the protruding portion 32 into the housing 20. Definitely, alternatively, the guide function of the outer side face may be omitted. For example, the outer side face may be parallel to the inner surface 221 of the sidewall.

The top end face 321 of the protruding portion 32 may be a flat face or curved face. Optionally, the top end face 321 of the protruding portion 32 is a flat face.

In some embodiments, the housing 20 includes a sidewall 22. The sidewall 22 extends along the thickness direction Z and is disposed around the electrode assembly 10. The protruding portion 32 includes a blocking face 323 oriented toward the sidewall 22, and the blocking face 323 is parallel to the thickness direction Z and extends from the inner surface 31a of the cap body toward the electrode assembly 10.

The blocking face 323 may be directly connected to the inner surface 31a of the cap body, or may be indirectly connected to the inner surface 31a of the cap body by another face.

The outer side face of the protruding portion 32 includes a blocking face 323. The blocking face 323 may be directly connected to the top end face 321 of the protruding portion 32 or indirectly connected to the top end face 321 by another surface.

During welding between the sidewall 22 and the cap body 31, the laser beam is radiated onto the blocking face 323 through the gap between the outer end face 24 and the inner surface 31a of the cap body. The blocking face 323 and the sidewall 22 are disposed parallel to each other, and can limit a reflection direction of the laser beam, thereby reducing, to some extent, the risk of burning other members in the housing 20 by a reflected laser beam.

In some embodiments, the blocking face 323 is perpendicular to the inner surface 31a of the cap body, so that the blocking face 323 is perpendicular to an irradiation direction of the laser beam.

During welding between the sidewall 22 and the cap body 31, the laser beam is applied to the junction between the outer end face 24 and the inner surface 31a of the cap body. The irradiation direction of the laser beam is parallel to the inner surface 31a of the cap body. When the laser beam is radiated onto the blocking face 323 through the gap between the outer end face 24 and the inner surface 31a of the cap body, an incident angle of the laser beam is 0°. In this way, the laser beam can be reflected to the junction between the outer end face 24 and the inner surface 31a of the cap body to reduce the risk that the laser beam burns other members after being reflected in the housing 20.

In some embodiments, the protruding portion 32 further includes a guide face 322 oriented toward the sidewall 22. The guide face 322 is connected to an end that is the blocking face 323 and that is oriented away from the inner surface 31a of the cap body. The guide face 322 tilts away from the sidewall 22 against the blocking face 323 to guide insertion of the protruding portion 32 into the housing 20.

The outer side face of the protruding portion 32, which is oriented toward the sidewall 22, includes the guide face 322 and the blocking face 323. The guide face 322 may be directly connected to the top end face 321 or indirectly connected to the top end face 321 by another surface. The guide face 322 is disposed around in one circle.

The guide face 322 is spaced apart from the inner surface 221 of the sidewall. In a direction pointing to the electrode assembly 10 from the end cap 30, the spacing between the guide face 322 and the inner surface 221 of the sidewall increases gradually. The direction pointing to the electrode assembly 10 from the end cap 30 is parallel to the thickness direction Z. The spacing between the guide face 322 and the inner surface 221 of the sidewall means a dimension of the clearance between the guide face 322 and the inner surface 221 of the sidewall in a normal direction of the inner surface 221 of the sidewall.

In this application, by disposing a tilting guide face 322 on the protruding portion 32, the protruding portion 32 can be guided into the housing 20 in a process of fitting the end cap 30 onto the housing 20, thereby simplifying the assembling process and improving the assembling efficiency.

In some embodiments, at least a part of the guide face 322 may be formed by making a rounded corner on the protruding portion 32.

In some embodiments, a connecting portion 324 is formed between the top end face 321 of the protruding portion 32 and the bottom face 331 of the first recessed portion 33. The connecting portion 324 is configured to be welded to the first tab 12 of the electrode assembly 10.

During assembling, the top end face 321 of the protruding portion 32 may be disposed in abutment with the first tab 12, and then a laser beam is radiated onto the bottom face 331 of the first recessed portion 33. A part of the connecting portion 324 and a part of the first tab 12 are melted by the laser beam and connected together to implement welding between the connecting portion 324 and the first tab 12.

In this embodiment, the connecting portion 324 of the protruding portion 32 may be directly welded to the first tab 12 without requiring other adapters, thereby simplifying the structure of the battery cell 7. In this embodiment, the thickness of the connecting portion 324 is reduced by the first recessed portion 33, thereby reducing the welding power required for welding the connecting portion 324 to the first tab 12, reducing heat emission, and reducing the risk of burning other members.

In some examples, the cap body 31 includes a first plate body 311 and a second plate body 312. The first plate body 311 is disposed around the protruding portion 32 and configured to be laser-welded to the housing 20, and the protruding portion 32 is disposed around the second plate body 312.

Both the first plate body 311 and the second plate body 312 are approximately flat plate structures. Both the first plate body 311 and the protruding portion 32 are annular.

The protruding portion 32 is configured to block the laser beam. Therefore, the spacing between the protruding portion 32 and the sidewall 22 is relatively small, so that the overall area of the first plate body 311 is relatively small. After the battery cell is mounted onto the electrical device, because the first recessed portion 33 is formed on the side that is of the protruding portion 32 and that is oriented away from the electrode assembly 10, a support structure of the electrical device is generally unable to support the battery cell 7 through the protruding portion 32. If the cap body 31 includes the first plate body 311 alone, when the battery cell is mounted into the electrical device, the support structure of the electrical device supports the entire battery cell 7 through the first plate body 311 alone. In this way, the first plate body 311 is excessively stressed and prone to deform, resulting in insufficient stability of the battery cell 7. In this embodiment of this application, a second plate body 312 is disposed inside the protruding portion 32 to increase the area of the cap body 31, so that the external support structure can effectively support the battery cell 7 through the cap body 31, thereby enhancing structural stability of the battery cell 7.

In some embodiments, the battery cell 7 further includes a current collecting member 50. The current collecting member 50 is configured to electrically connect the first tab 12 of the electrode assembly 10 and the end cap 30.

The current collecting member 50 can implement conduction between the end cap 30 and the first tab 12, so that the housing 20 and the first tab 12 are of the same polarity.

The current collecting member 50 may be connected to the first tab 12 by welding, bonding, or other means to implement electrical connection to the first tab 12. The current collecting member 50 may be connected to the end cap 30 by welding, bonding, or other means to implement electrical connection to the end cap 30.

The current collecting member 50 may be connected to the protruding portion 32 and may be connected to the second plate body 312.

A second plate body 312 and a first plate body 311 are disposed on an inner side and an outer side of the protruding portion 32 respectively, and the first plate body 311 is configured to be welded to the housing 20. The external support structure can support the battery cell 7 through the first plate body 311 and the second plate body 312 to improve the structural stability of the battery cell 7.

The protruding portion 32 protrudes from the cap body 31. Therefore, the protruding portion 32 separates the cap body 31 from the first tab 12 in the thickness direction Z. If the end cap 30 and the first tab 12 are directly connected, the first tab 12 can be connected just to the protruding portion 32 of the end cap 30. If the protruding portion 32 and the first tab 12 are directly connected, merely a part that is of the first tab 12 and that is opposite to the protruding portion 32 can be directly connected to the protruding portion 32. Consequently, the region of the first tab 12, from which the current can be directly transmitted, is restricted by the protruding portion 32. The flow area between the protruding portion 32 and the first tab 12 is insufficient. For the current carried on a part that is of the first tab 12 and that is opposite to the second plate body 312 along the thickness direction Z, the current can flow to the protruding portion 32 only after flowing to a part that is of the first tab 12 and that is welded to the protruding portion 32. Consequently, different regions of the first tab 12 conduct electricity to the end cap 30 along different paths, and the difference of the paths is excessive and impairs the flow capacity and charging efficiency of the battery cell 7.

In this embodiment of this application, the first tab 12 and the end cap 30 are connected by the current collecting member 50. In this way, the region of the first tab 12, from which the current can be directly transmitted, is no longer restricted by the protruding portion 32. The current of the first tab 12 can flow together into the end cap 30 through the current collecting member 50. In this way, the current collecting member can reduce the difference of paths along which different regions of the first tab 12 conduct electricity to the end cap 30, improve uniformity of the current density of the first electrode plate, reduce the internal resistance, and increase the flow capacity and charging efficiency of the battery cell 7.

In some embodiments, the current collecting member 50 includes a first current collecting portion 51 and a second current collecting portion 52 connected to the first current collecting portion 51. The first current collecting portion 51 is configured to be connected to the first tab 12 so that the current collecting member 50 is electrically connected to the first tab 12. The second current collecting portion 52 surrounds the first current collecting portion 51. The second current collecting portion 52 is configured to be connected to at least one of the protruding portion 32 or the second plate body 312 so that the current collecting member 50 is electrically connected to the end cap 30.

The first current collecting portion 51 may be connected to the first tab 12 by welding, bonding, or other means. The second current collecting portion 52 may be connected to the end cap 30 by welding, bonding, or other means.

In some embodiments, the first current collecting portion 51 is located between the second plate body 312 and the first tab 12 and welded to the first tab 12, and the second current collecting portion 52 is located between the first tab 12 and the protruding portion 32 and welded to the protruding portion 32.

During assembling of the end cap 30 and the current collecting member 50, the laser beam may be applied to the surface that is of the protruding portion 32 and that is oriented away from the second current collecting portion 52, so as to weld the protruding portion 32 and the second current collecting portion 52 from the outside. In this embodiment, the thickness of the connecting portion 324 of the protruding portion 32 is reduced by the first recessed portion 33, thereby reducing the welding power required for welding the protruding portion 32 to the second current collecting portion 52, reducing heat emission, and reducing the risk of burning other components (such as a separator).

Optionally, the surface that is of the second current collecting portion 52 and that is oriented away from the protruding portion 32 abuts on the first tab 12, so that the protruding portion 32 supports the first tab 12 through the second current collecting portion 52. The surface that is of the first current collecting portion 51 and that is oriented toward the first tab 12 abuts on and is welded to the first tab 12.

In some embodiments, the current collecting member 50 is flat plate-shaped.

The flat plate-shaped current collecting member 50 is easier to form. The flat plate-shaped current collecting member 50 can be entirely in contact with the first tab 12, thereby increasing a flow area, enabling the current collecting member 50 to support the first tab 12 more evenly, and reducing the risk of offset and misalignment of the electrode plate of the electrode assembly 10 in the thickness direction Z.

In the flat plate-shaped current collecting member 50, the part that is of the current collecting member 50 and that abuts on the protruding portion 32 is the second current collecting portion 52, and the part that is of the current collecting member 50 and that is surrounded by the second current collecting portion 52 is the first current collecting portion 51.

In some embodiments, the protruding portion 32 supports the electrode assembly 10 through the current collecting member 50.

The protruding portion 32 in this embodiment can support the electrode assembly 10 through the first current collecting portion 51 and the second current collecting portion 52, so as to reduce the risk of offset and misalignment of the electrode plate of the electrode assembly 10 in the thickness direction Z.

Figure 7:
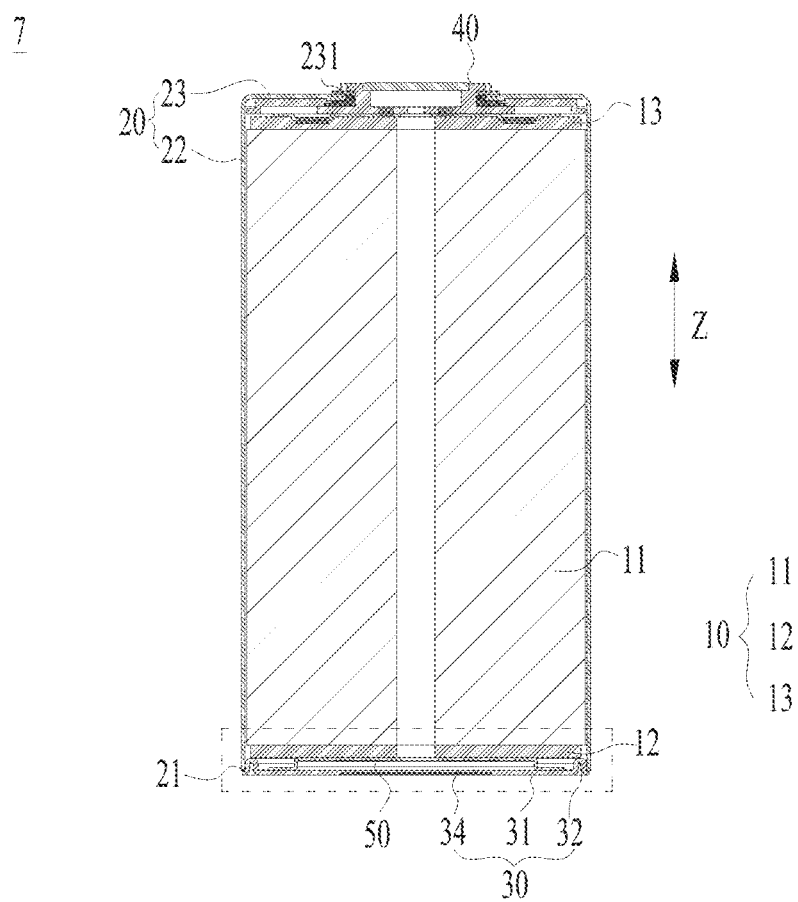
FIG. 7 is a schematic sectional view of a battery cell according to other embodiments of this application.
Figure 8:
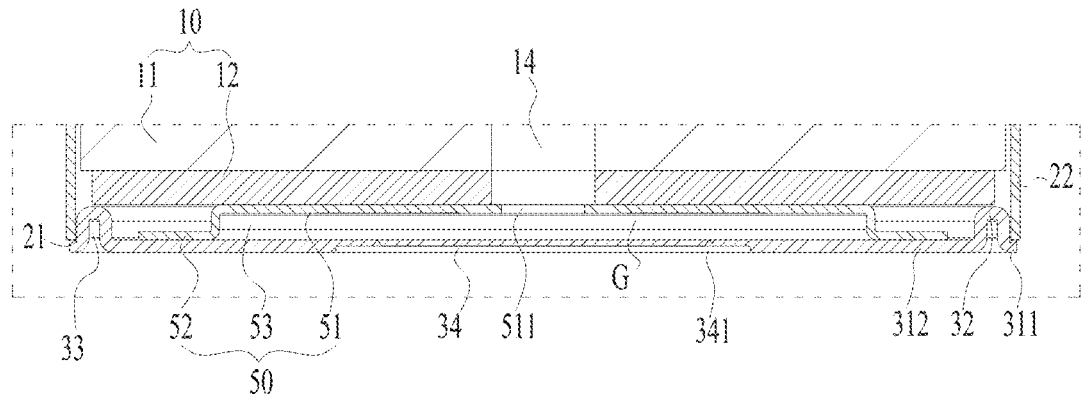
FIG. 8 is schematic close-up view of a rectangular position C of the battery cell shown in FIG. 7.

FIG. 7 is a schematic sectional view of a battery cell according to other embodiments of this application; and FIG. 8 is schematic close-up view of a rectangular position C of the battery cell shown in FIG. 7.

As shown in FIG. 7 and FIG. 8, in some embodiments, the current collecting member 50 is located between the second plate body 312 and the first tab 12, and the protruding portion 32 surrounds the current collecting member 50.

In this embodiment, the protruding portion 32 does not overlap the current collecting member 50 in the thickness direction Z, thereby reducing space occupation by the end cap 30 and the current collecting member 50 in the thickness direction Z and increasing the energy density.

In some embodiments, the second current collecting portion 52 is welded to the second plate body 312, and the first current collecting portion 51 is welded to the first tab 12.

The second current collecting portion 52 directly abuts on the second plate body 312 and is connected to the second plate body 312 by laser welding. Illustratively, the laser beam may be applied onto the second plate body 312, so as to weld the second plate body 312 and the second current collecting portion 52 from the outside.

The welding reduces a contact resistance between the second current collecting portion 52 and the second plate body 312, and a contact resistance between the first current collecting portion 51 and the first tab 12, and improves the flow capacity.

In some embodiments, the first current collecting portion 51 is disposed protrusively on a surface that is of the second current collecting portion 52 and that is oriented toward the electrode assembly 10. A second recessed portion 53 is formed on the current collecting member 50 at a position corresponding to the first current collecting portion 51, and is recessed toward the electrode assembly 10 from a surface that is of the second current collecting portion 52 and that is oriented away from the electrode assembly 10.

The first current collecting portion 51 is disposed protrusively on the second current collecting portion 52 and abuts on the first tab 12, so as to separate the first tab 12 from the second current collecting portion 52. In this way, during welding between the second plate body 312 and the second current collecting portion 52, the heat transferred to the electrode assembly 10 is reduced, and the risk of burning the separator of the electrode assembly 10 is reduced.

In this embodiment, the thickness of the first current collecting portion 51 is reduced by the second recessed portion 53, thereby reducing the welding power required for welding the first current collecting portion 51 to the first tab 12, reducing heat emission, and reducing the risk of burning other members (such as the separator).

In some embodiments, the protruding portion 32 and the first current collecting portion 51 support the electrode assembly 10.

The first current collecting portion 51 supports a middle region of the first tab 12, and the protruding portion 32 supports an edge region of the first tab 12, thereby improving uniformity of the force on the first tab 12 and reducing the risk of offset and misalignment of the electrode plate of the electrode assembly 10 in the thickness direction Z.

In some embodiments, a pressure relief mechanism 34 connected to the second plate body 312 is disposed on the end cap 30, and the pressure relief mechanism 34 is configured to be actuated when an internal pressure of the battery cell 7 reaches a threshold, so as to release the internal pressure; and In the thickness direction Z, the first current collecting portion 51 is disposed opposite to the pressure relief mechanism 34, and an avoidance clearance G exists between the first current collecting portion 51 and the pressure relief mechanism 34.

The pressure relief mechanism 34 means an element or component that is actuated to relieve an internal pressure when the internal pressure of the battery cell 7 reaches a preset threshold. The threshold may vary depending on design requirements. The threshold may depend on the material of one or more of the positive electrode plate, the negative electrode plate, the electrolytic solution, or the separator in the battery cell 7. The pressure relief mechanism 34 may be in the form of an explosion-proof valve, a gas valve, a pressure relief valve, a safety valve, or the like, and may specifically adopt a pressure-sensitive element or structure. To be specific, when the internal pressure of the battery cell 7 reaches a preset threshold, the pressure relief mechanism 34 performs an action or a fragile structure disposed in the pressure relief mechanism 34 is ruptured to form an opening or duct for relieving the internal pressure or temperature.

The term "actuated" mentioned in this application means that the pressure relief mechanism 34 performs an action or is activated to a given state so that the internal pressure of the battery cell 7 is relieved. The actions performed by the pressure relief mechanism 34 may include, but are not limited to rupturing, shattering, tearing, or bursting open at least a part of the pressure relief mechanism 34, or the like. When the pressure relief mechanism 34 is actuated, high-temperature and high-pressure substances inside the battery cell 7 are expelled as emissions out of the actuated position. In this way, the pressure of the battery cell 7 is released under a controllable pressure circumstance to avoid potential severer accidents.

The emissions out of the battery cell 7 mentioned in this application include but are not limited to: electrolytic solution, melted or split positive and negative electrode plates, fragments of the separator, reaction-induced high-temperature and high-pressure gases, flames, and the like.

The pressure relief mechanism 34 is a part of the end cap 30, and may be integrally formed together with the second plate body 312. Alternatively, the pressure relief mechanism 34 and the second plate body 312 may be two stand-alone members provided separately, and may be connected together by welding, riveting, bonding, or other means.

The first current collecting portion 51 and the pressure relief mechanism 34 at least partly overlap in the thickness direction Z. Therefore, if the first current collecting portion 51 is in contact with the pressure relief mechanism 34, the first current collecting portion 51 may block expelling of the high-temperature and high-pressure substances when the pressure relief mechanism 34 is actuated, thereby posing safety hazards. In addition, if the first current collecting portion 51 is in contact with the pressure relief mechanism 34, when the battery cell 7 vibrates, the first current collecting portion 51 is prone to crush the pressure relief mechanism 34 and cause the pressure relief mechanism 34 to fail.

In this embodiment, the avoidance clearance G is disposed between the first current collecting portion 51 and the pressure relief mechanism 34 to reduce the risk that the first current collecting portion 51 crushes the pressure relief mechanism 34, and to ensure smooth degassing when the pressure relief mechanism 34 is actuated, and in turn, reduce the safety hazards.

In some embodiments, a second recessed portion 53 is disposed on a side that is of the first current collecting portion 51 and that is oriented toward the end cap so as to separate the first current collecting portion 51 from the pressure relief mechanism 34 and form the avoidance clearance G. In other embodiments, for a flat plate-shaped current collecting member 50, the protruding portion 32 supports the first current collecting portion 51 through the second current collecting portion 52, so as to separate the first current collecting portion 51 from the pressure relief mechanism 34 and form the avoidance clearance G.

In some embodiments, a third recessed portion 341 is formed on the end cap 30 at a position corresponding to the pressure relief mechanism 34, and is recessed from an outer surface of the second plate body 312 toward the electrode assembly 10. A groove is made at the bottom of the third recessed portion 341. The pressure relief mechanism 34 is ruptured along the groove to release the internal pressure when the internal pressure of the battery cell 7 reaches a threshold.

In some embodiments, the second plate body 312 is an annular flat plate around the pressure relief mechanism 34.

In some embodiments, the electrode assembly 10 is a jelly-roll structure, and a first through-hole 14 is made at a winding center of the electrode assembly 10. A second through-hole 511 is made in the first current collecting portion 51, and the second through-hole 511 is disposed opposite to the first through-hole 14, so as to make the first through-hole 14 communicate with the avoidance clearance G.

In the thickness direction Z, the first through-hole 14 and the second through-hole 511 at least partly overlap.

When the electrode assembly 10 is thermally runaway, high-temperature and high-pressure materials can quickly enter the avoidance clearance G through the first through-hole 14 and the second through-hole 511, and act on the pressure relief mechanism 34, so that the pressure relief mechanism 34 can be actuated in time to reduce safety hazards.

Figure 9:
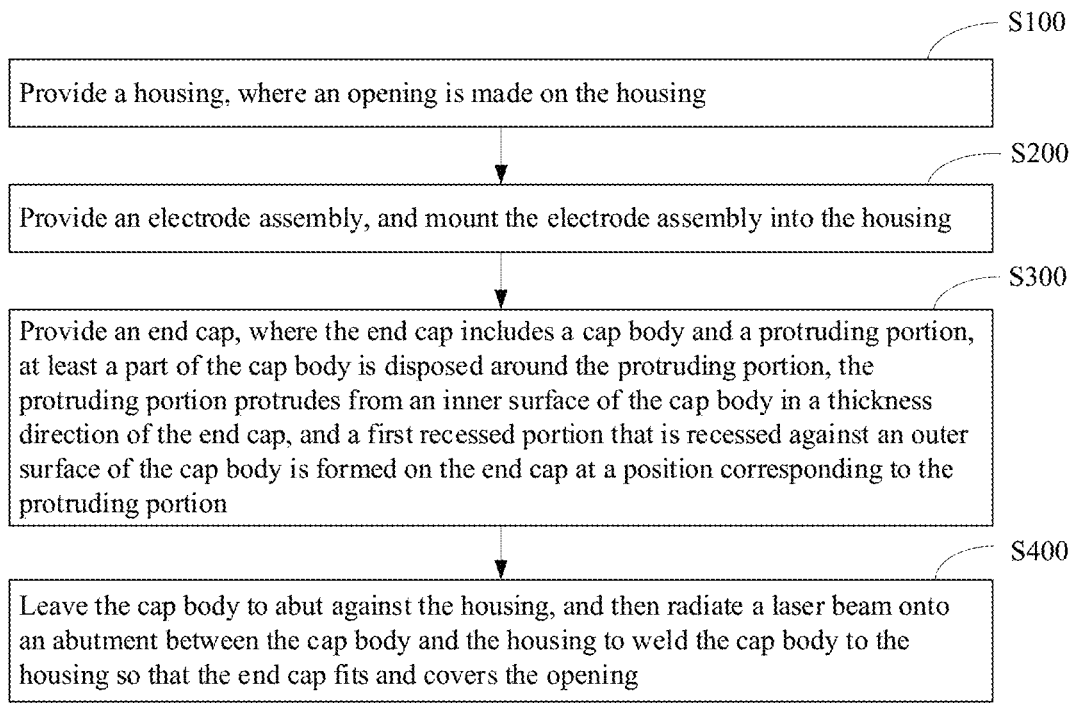
FIG. 9 is a schematic flowchart of a method for manufacturing a battery cell according to some embodiments of this application.

FIG. 9 is a schematic flowchart of a method for manufacturing a battery cell according to some embodiments of this application.

As shown in FIG. 9, the method for manufacturing a battery cell according to an embodiment of this application includes the following steps:

S100: Providing a housing, where an opening is made on the housing;

S200: Providing an electrode assembly, and mounting the electrode assembly into the housing;

S300: Providing an end cap, where the end cap includes a cap body and a protruding portion, at least a part of the cap body is disposed around the protruding portion, the protruding portion protrudes from an inner surface of the cap body in a thickness direction of the end cap, and a first recessed portion that is recessed against an outer surface of the cap body is formed on the end cap at a position corresponding to the protruding portion;

S400: Leaving the cap body to abut against the housing, and then radiating a laser beam onto an abutment between the cap body and the housing to weld the cap body to the housing so that the end cap fits and covers the opening.

The protruding portion protrudes from an inner surface of the cap body toward the electrode assembly, and is configured to block the laser beam during welding between the cap body and the housing; and the first recessed portion is recessed from an outer surface of the cap body toward the electrode assembly and configured to release a stress during welding between the cap body and the housing.

It is hereby noted that, for the related structures of the battery cells manufactured according to the foregoing method for manufacturing a battery cell, refer to the descriptions of the battery cells provided in the foregoing embodiments.

In assembling a battery cell based on the foregoing method for manufacturing a battery cell, the foregoing steps are not necessarily performed in sequence. That is, the steps may be performed in the order mentioned in the embodiments, or the steps may be performed in order different from what is mentioned in the embodiments, or several steps are performed concurrently. For example, step S100 and step S300 are not necessarily performed sequentially, but may be performed simultaneously.

Figure 10:
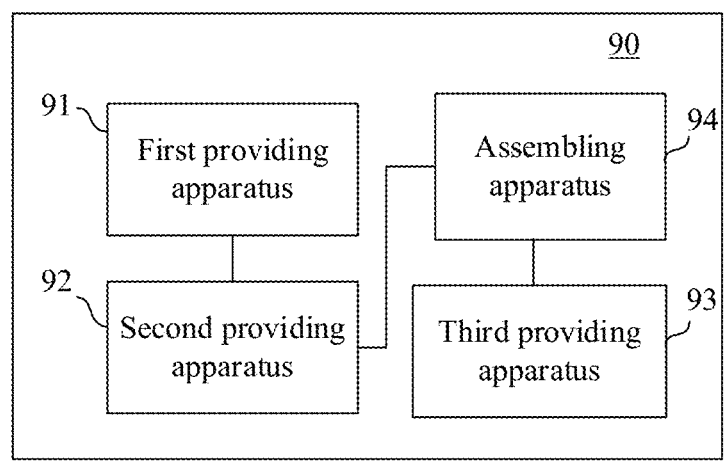
FIG. 10 is a schematic block diagram of a system for manufacturing a battery cell according to some embodiments of this application.

FIG. 10 is a schematic block diagram of a system for manufacturing a battery cell according to some embodiments of this application.

As shown in FIG. 11, the system 90 for manufacturing a battery cell according to an embodiment of this application includes:

a first providing apparatus 91, configured to provide a housing, where an opening is made on the housing;

a second providing apparatus 92, configured to provide an electrode assembly, and mount the electrode assembly into the housing;

a third providing apparatus 93, configured to provide an end cap, where the end cap includes a cap body and a protruding portion, at least a part of the cap body is disposed around the protruding portion, the protruding portion protrudes from an inner surface of the cap body in a thickness direction of the end cap, and a first recessed portion that is recessed against an outer surface of the cap body is formed on the end cap at a position corresponding to the protruding portion; and an assembling apparatus 94, configured to leave the cap body to abut against the housing, and then radiate a laser beam onto an abutment between the cap body and the housing to weld the cap body to the housing so that the end cap fits and covers the opening.

The protruding portion protrudes from an inner surface of the cap body toward the electrode assembly, and is configured to block the laser beam during welding between the cap body and the housing; and the first recessed portion is recessed from an outer surface of the cap body toward the electrode assembly and configured to release a stress during welding between the cap body and the housing.

For the related structures of the battery cells manufactured by the foregoing manufacturing system, refer to the descriptions of the battery cells provided in the foregoing embodiments.

It is hereby noted that to the extent that no conflict occurs, the embodiments of this application and the features in the embodiments may be combined with each other.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the spirit and scope of the technical solutions of the embodiments of this application.

What is claimed is:

1. A battery cell, comprising:
a housing having an opening;
an electrode assembly, accommodated in the housing;
an end cap, comprising a cap body and a protruding structure, wherein the cap body comprises a first plate body and a second plate body, the first plate body is disposed around the protruding structure and laser-welded to the housing so that the end cap fits and covers the opening, and the protruding structure is disposed around the second plate body; and
a current collecting structure to electrically connect a first tab of the electrode assembly and the end cap, wherein the current collecting structure comprises a first current collecting structure and a second current collecting structure connected to the first current collecting structure, the first current collecting structure is connected to the first tab so that the current collecting structure is electrically connected to the first tab; and the second current collecting structure surrounds the first current collecting structure, and the second current collecting structure is connected to at least one of the protruding structure or the second plate body so that the current collecting structure is electrically connected to the end cap, wherein
in a thickness direction of the end cap, the protruding structure protrudes from an inner surface of the cap body toward the electrode assembly, and is configured to block a laser beam during welding between the cap body and the housing;

a first recess is formed on the end cap at a position corresponding to the protruding structure, the first recess is recessed from an outer surface of the cap body toward the electrode assembly, and the first recess is configured to release a stress during welding between the cap body and the housing; and in the thickness direction, a bottom face of the first recess is closer to the electrode assembly than the entire inner surface of the cap body.

2. The battery cell according to claim 1, wherein the housing comprises an outer end face around the opening, and the outer end face of the housing is welded to the inner surface of the cap body so that the housing and the cap body are connected together.

3. The battery cell according to claim 1, wherein the housing comprises a sidewall, and the sidewall extends along the thickness direction and is disposed around the electrode assembly; and
the protruding structure comprises a blocking face oriented toward the sidewall, and the blocking face is parallel to the thickness direction and extends from the inner surface of the cap body toward the electrode assembly.

4. The battery cell according to claim 3, wherein the protruding structure further comprises a guide face oriented toward the sidewall, the guide face is connected to an end that is the blocking face and that is oriented away from the inner surface of the cap body, and the guide face tilts away from the sidewall against the blocking face to guide insertion of the protruding structure into the housing.

5. The battery cell according to claim 1, wherein a connecting structure is formed between a top end face of the protruding structure and a bottom face of the first recess, and the connecting structure is welded to a first tab of the electrode assembly.

6. The battery cell according to claim 1, wherein the first current collecting structure is located between the second plate body and the first tab and welded to the first tab, and the second current collecting structure is located between the first tab and the protruding structure and welded to the protruding structure.

7. The battery cell according to claim 6, wherein the current collecting structure is flat plate-shaped.

8. The battery cell according to claim 6, wherein the protruding structure supports the electrode assembly through the current collecting structure.

9. The battery cell according to claim 1, wherein the current collecting structure is located between the second plate body and the first tab, and the protruding structure surrounds the current collecting structure.

10. The battery cell according to claim 9, wherein the second current collecting structure is welded to the second plate body, and the first current collecting structure is welded to the first tab.

11. The battery cell according to claim 9, wherein the first current collecting structure is disposed protrusively on a surface that is of the second current collecting structure and that is oriented toward the electrode assembly, and a second recess is formed on the current collecting structure at a position corresponding to the first current collecting structure, and the second recess is recessed toward the electrode assembly from a surface that is of the second current collecting structure and that is oriented away from the electrode assembly.

12. The battery cell according to claim 11, wherein both the protruding structure and the first current collecting structure support the electrode assembly.

13. The battery cell according to claim 1, wherein a pressure relief structure connected to the second plate body is disposed on the end cap, and the pressure relief structure is actuated when an internal pressure of the battery cell reaches a threshold, so as to release the internal pressure; and in the thickness direction, the first current collecting structure is disposed opposite to the pressure relief structure, and an avoidance clearance exists between the first current collecting structure and the pressure relief structure.

14. The battery cell according to claim 13, wherein the electrode assembly is a jelly-roll structure, and a first through-hole is made at a winding center of the electrode assembly; and a second through-hole is made in the first current collecting structure, and the second through-hole is disposed opposite to the first through-hole, so as to make the first through-hole communicate with the avoidance clearance.

15. A battery, comprising a plurality of battery cells comprising the battery cell according to claim 1.

16. An electrical device, comprising the battery according to claim 15, wherein the battery is configured to provide electrical energy.

* * * * *